(12) United States Patent
Zhao

(10) Patent No.: US 12,256,397 B2
(45) Date of Patent: Mar. 18, 2025

(54) RESOURCE ALLOCATION METHOD, TERMINAL AND NODE DEVICE

(71) Applicant: DATANG MOBILE COMMUNICATIONS EQUIPMENT CO., LTD., Beijing (CN)

(72) Inventor: Yali Zhao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 575 days.

(21) Appl. No.: 17/290,687

(22) PCT Filed: Oct. 30, 2019

(86) PCT No.: PCT/CN2019/114342
§ 371 (c)(1),
(2) Date: Apr. 30, 2021

(87) PCT Pub. No.: WO2020/088524
PCT Pub. Date: May 7, 2020

(65) Prior Publication Data
US 2022/0022244 A1    Jan. 20, 2022

(30) Foreign Application Priority Data

Oct. 31, 2018   (CN) .......................... 201811288189.3

(51) Int. Cl.
*H04W 72/14* (2009.01)
*H04W 72/12* (2023.01)
*H04W 72/23* (2023.01)
*H04W 72/566* (2023.01)

(52) U.S. Cl.
CPC ......... *H04W 72/23* (2023.01); *H04W 72/569* (2023.01)

(58) Field of Classification Search
CPC . H04W 76/14; H04W 28/0252; H04W 72/23; H04W 72/543; H04W 72/569; H04W 92/18
See application file for complete search history.

(56) References Cited

U.S. PATENT DOCUMENTS

| | | |
|---|---|---|
| 11,395,210 B2 * | 7/2022 | Sebire .................. H04L 5/0096 |
| 2017/0257876 A1 | 9/2017 | Loehr et al. |
| 2019/0053251 A1 * | 2/2019 | Loehr ............... H04W 72/1263 |

(Continued)

FOREIGN PATENT DOCUMENTS

| | | |
|---|---|---|
| CN | 107079530 A | 8/2017 |
| CN | 107241786 A | 10/2017 |

(Continued)

OTHER PUBLICATIONS

Extended European Search Report from EP app. No. 19880158.1, dated Nov. 29, 2021, all pages.

(Continued)

*Primary Examiner* — Awet Haile
(74) *Attorney, Agent, or Firm* — Ladas & Parry, LLP

(57) ABSTRACT

A resource allocation method, a terminal and a node device are provided. The resource allocation method includes determining a sidelink grant; allocating resources to sidelink logical channels according to the sidelink grant and a mapping relationship between sidelink logical channels and logical channel prioritization restrictions parameters.

12 Claims, 3 Drawing Sheets

(56) References Cited

U.S. PATENT DOCUMENTS

| | | | |
|---|---|---|---|
| 2019/0090198 A1 | 3/2019 | Zhao | |
| 2019/0116626 A1 | 4/2019 | Zhao | |
| 2019/0124684 A1* | 4/2019 | Folke | H04W 72/23 |
| 2020/0137768 A1* | 4/2020 | Jose | H04W 72/56 |
| 2021/0029720 A1* | 1/2021 | Wang | H04W 72/23 |
| 2021/0058817 A1* | 2/2021 | Wu | H04W 72/56 |
| 2021/0153065 A1* | 5/2021 | Adjakple | H04W 28/0263 |
| 2021/0274545 A1* | 9/2021 | Adjakple | H04W 72/21 |

FOREIGN PATENT DOCUMENTS

| | | |
|---|---|---|
| EP | 3206452 A1 | 8/2017 |
| WO | 2017167073 A1 | 10/2017 |

OTHER PUBLICATIONS

"LCP restrictions and modelling", R2-1710131, 3GPP TSG RAN WG2 #99-Bis, Prague, Czech Republic, Oct. 9-13, 2017, all pages.

"Discussion on LCP restrictions", R2-1802259, 3GPP TSG-RAN WG2 Meeting 101, Athens, Greece, Feb. 26-Mar. 3, 2018, all pages.

"The naming of new RNTI and impacts on MAC", R2-1809924, 3GPP TSG-RAN2#AH 1807, Montreal, Canada, Jul. 2-6, 2018, all pages.

International Search Report from PCT/CN2019/114342, dated Feb. 1, 2020, with English translation from WIPO, all pages.

Written Opinion of the International Searching Authority from PCT/CN2019/114342, dated Feb. 1, 2020, with English translation from WIPO, all pages.

Preliminary Report on from PCT/CN2019/114342, dated 2021, with English translation from WIPO, all pages.

Office action from corresponding Korean Patent Application No. 10-2021-7015691 dated Feb. 14, 2024, and its English translation.

Samsung, R2-1806116, consideration on LCP for eV2X, 3GPP TSG-RAN WG2 #101bis, 3GPP (Apr. 6, 2018), Sanya, China.

Huawei et al., R2-1814245, discussion on L2 protocol design for NR sidelink, 3GPP TSG-RAN WG2 #103bis, 3GPP (Sep. 28, 2018), Chengdu, China.

InterDigital Inc. (Email discussion rapporteur), R2-1712786, the Summary of [99b#40] [NR UP/MAC] LCP, 3GPP TSG-RAN WG2 #100, 3GPP (Nov. 17, 2017), Reno, Nevada.

* cited by examiner

RESOURCE ALLOCATION METHOD, TERMINAL AND NODE DEVICE

CROSS-REFERENCE TO RELATED APPLICATIONS

This application is a U.S. national phase application of a PCT Application No. PCT/CN2019/114342 filed on Oct. 30, 2019, which claims a priority to Chinese Patent Application No. 201811288189.3 filed in China on Oct. 31, 2018, the disclosures of which are incorporated in their entireties by reference herein.

TECHNICAL FIELD

The present disclosure relates to the field of communications application, in particular, relates to a resource allocation method, a terminal and a node device.

BACKGROUND

A process of LCP (Logical Channel Prioritization) of a sidelink (also called a direct communication interface) in an LTE (Long Term Evolution) system is as follows:
1) Step 0: selecting a destination;
Specifically, the destination corresponding to a LC with a highest priority and currently available to data.
2) For each MAC (Medium Access Control) PDU (Protocol Data Unit):
Step 1: allocating a resource to the LC with the highest priority and available to data corresponding to the destination selected in Step 0.
Step 2: if there are remaining resources, allocating, sequentially in a descending order, resources to LCs available to the destination selected in Step 0, until the resources are exhausted or all of the LCs have been allocated resources.

For a NR (New Radio) system, factors to be considered for LCP of a Uu interface are called LCP restrictions, specifically, the LCP restrictions include following:
  allowed a subcarrier spacing list (allowedSCS-List) to be used, which reflects delay requirements;
  a maximum duration of a physical uplink shared channel (maxPUSCH-Duration), which reflects a duration of the delay requirements;
  whether a pre-configured grant type 1 is allowed (configuredGrantType1Allowed), which is used for URLLC;
  allowed serving cells (allowedServingCells) introduced by duplication, but use thereof not limited to the duplication.

There is no corresponding solution for how to execute the LCP process of the sidelink when the sidelink is used for data transmission in the NR system.

SUMMARY

An objective of the present disclosure is to provide a resource allocation method, a terminal, and a node device, to solve a problem of how a terminal performs an LCP process of a sidelink when a sidelink is used for data transmission by the terminal.

To achieve the above objective, the embodiments of the present disclosure provide a resource allocation method performed by a terminal. The method includes: determining a sidelink grant; allocating resources to sidelink logical channels according to the sidelink grant and a mapping relationship between sidelink logical channels and logical channel prioritization restrictions parameters.

The logical channel prioritization restrictions parameters include at least one of following parameters: a list of radio access technologies allowed to be used at a sidelink by a logical channel; a list of resource types allowed to be used at a sidelink by a logical channel; a list of subcarrier spacings allowed to be used at a sidelink by a logical channel; a maximum length of a transmission time interval allowed to be used at a sidelink by a logical channel; whether pre-configured resources are allowed to be used at a sidelink by a logical channel.

The method further includes: determining the mapping relationship between logical channels and logical channel prioritization restrictions parameters.

The method further includes: acquiring the mapping relationship, configured by a resource allocation management node, between logical channels and logical channel prioritization restrictions parameters.

Acquiring the mapping relationship, configured by the resource allocation management node, between logical channels and logical channel prioritization restrictions parameters includes: reporting logical channels of each sidelink and radio access technologies and/or resource types corresponding to the logical channels of each sidelink to the resource allocation management node, or reporting logical channels of each sidelink and quality-of-service parameters corresponding to the logical channels of each sidelink to the resource allocation management node; acquiring the mapping relationship, configured by the resource allocation management node, between logical channels and logical channel prioritization restrictions parameters.

The method further includes: acquiring a mapping relationship, configured by the resource allocation management node, between quality-of-service parameters corresponding to sidelink logical channels and logical channel prioritization restrictions parameters.

After acquiring a mapping relationship, configured by the resource allocation management node, between quality-of-service parameters corresponding to sidelink logical channels and logical channel prioritization restrictions parameters, the method further includes: determining the mapping relationship between logical channels and logical channel prioritization restrictions parameters, according to the quality-of-service parameters corresponding to sidelink logical channels and according to the mapping relationship between the quality-of-service parameters corresponding to the sidelink logical channels and the logical channel prioritization restrictions parameters.

The method further includes: determining a mapping relationship between logical channels and a first part of logical channel prioritization restrictions parameters; acquiring a mapping relationship, configured by a resource allocation management node, between logical channels and a second part of logical channel prioritization restrictions parameters.

The first part of logical channel prioritization restrictions parameters includes at least one of following parameters: a list of radio access technologies allowed to be used at a sidelink by a logical channel; a list of resource types allowed to be used at a sidelink by a logical channel; a list of subcarrier spacings allowed to be used at a sidelink by a logical channel; a maximum length of a transmission time interval allowed to be used at a sidelink by a logical channel; whether pre-configured resources are allowed to be used at a sidelink by a logical channel; wherein the second part of logical channel prioritization restrictions parameters are parameters, other than the first part of logical channel prioritization restrictions parameters, of the logical channel prioritization restrictions parameters.

The radio access technologies include at least one of following: a sidelink radio access technology based on 4G LTE Rel-14; a sidelink radio access technology based on 4G LTE Rel-15; a sidelink radio access technology based on 5G NR.

The resource types include unicast resources, multicast resources and broadcast resources; or broadcast resources and a set of unicast resources and multicast resources; or unicast resources and a set of multicast resources and broadcast resources.

Determining the sidelink grant includes: if a resource allocation mode selected by the terminal itself is used for the sidelink, determining that a target resource in a resource pool corresponding to the sidelink is the sidelink grant; if a scheduled resource allocation mode is used for the sidelink, receiving the sidelink grant, allocated by a resource allocation management node, corresponding to the sidelink.

Allocating the resource to sidelink logical channels according to the sidelink grant and the mapping relationship between sidelink logical channels and logical channel prioritization restrictions parameters, include: determining one or more first logical channels capable of using the sidelink grant, based on the sidelink grant and the mapping relationship between sidelink logical channels and logical channel prioritization restrictions parameters; determining one or more target logical channels satisfying a preset condition among the one or more first logical channels; allocating resources for the one or more target logical channels.

Determining the one or more first logical channels capable of using the sidelink grant, based on the sidelink grant and the mapping relationship between sidelink logical channels and logical channel prioritization restrictions parameters, includes: determining one or more second logical channels, in the sidelink, having a data transmission requirement; determining the one or more second logical channels as the one or more first logical channels, if the sidelink grant meets a requirement of logical channel prioritization restrictions parameters corresponding to the one or more second logical channels.

Determining the one or more target logical channels satisfying the preset condition among the one or more first logical channels includes: determining one or more logical channels with a highest priority among the one or more first logical channels by the terminal; determining a target identifier corresponding to the one or more logical channels with the highest priority by the terminal; determining one or more logical channels corresponding to the target identifier in the one or more first logical channels as the one or more target logical channels.

Allocating the resources for the one or more target logical channels, includes: allocating resources to logical channels in the one or more target logical channels sequentially in a descending order of priorities of the one or more target logical channels from high to low.

To achieve the above objective, the embodiments of the present disclosure further provide a resource allocation method performed by a node device. The resource allocation method includes: configuring a mapping relationship between sidelink logical channels and at least part of logical channel prioritization restrictions parameters for a terminal, or configuring a mapping relationship between quality-of-service parameters corresponding to sidelink logical channels and logical channel prioritization restrictions parameters for a terminal by the node device; feeding the mapping relationship back to the terminal.

Configuring the mapping relationship between sidelink logical channels and at least part of logical channel prioritization restrictions parameters for the terminal, includes: receiving logical channels of each sidelink and radio access technologies and/or resources type corresponding to the logical channels of each sidelink reported by the terminal, or receiving logical channels of each sidelink and quality-of-service parameters corresponding to the logical channels of each sidelink reported by the terminal; configuring the mapping relationship between the sidelink logical channels and at least part of logical channel prioritization restrictions parameters for the terminal.

The logical channel prioritization restrictions parameters include at least one of following parameters: a list of radio access technologies allowed to be used at a sidelink by a logical channel; a list of resource types allowed to be used at a sidelink by a logical channel; a list of subcarrier spacings allowed to be used at a sidelink by a logical channel; a maximum length of a transmission time interval allowed to be used at a sidelink by a logical channel; whether pre-configured resources are allowed to be used at a sidelink by a logical channel.

The radio access technologies include at least one of following: a sidelink radio access technology based on 4G LTE Rel-14; a sidelink radio access technology based on 4G LTE Rel-15; a sidelink radio access technology based on 5G NR.

The resource types include unicast resources, multicast resources and broadcast resources; or broadcast resources and a set of unicast resources and multicast resources; or unicast resources and a set of multicast resources and broadcast resources.

To achieve the above objective, the embodiments of the present disclosure further provide a terminal. The terminal includes a transceiver, a storage, a processor and a program stored on the storage and executable by the processor, wherein when the processor executes the program, the processor implements the steps of: determining a sidelink grant; allocating resources to sidelink logical channels according to the sidelink grant and a mapping relationship between sidelink logical channels and logical channel prioritization restrictions parameters.

The logical channel prioritization restrictions parameters include at least one of following parameters: a list of radio access technologies allowed to be used at a sidelink by a logical channel; a list of resource types allowed to be used at a sidelink by a logical channel; a list of subcarrier spacings allowed to be used at a sidelink by a logical channel; a maximum length of a transmission time interval allowed to be used at a sidelink by a logical channel; whether pre-configured resources are allowed to be used at a sidelink by a logical channel.

The processor further implements a following step when executing the program: determining the mapping relationship between logical channels and logical channel prioritization restrictions parameters.

The processor further implements the following step when executing the program: acquiring the mapping relationship, configured by a resource allocation management node, between logical channels and logical channel prioritization restrictions parameters.

The processor further implements the following steps when executing the program: reporting logical channels of each sidelink and radio access technologies and/or resource types corresponding to the logical channels of each sidelink to the resource allocation management node, or reporting logical channels of each sidelink and quality-of-service parameters corresponding to the logical channels of each sidelink to the resource allocation management node; acquiring the mapping relationship, configured by the resource allocation management node, between logical channels and logical channel prioritization restrictions parameters.

The processor further implements the following step when executing the program: acquiring a mapping relationship, configured by the resource allocation management node, between quality-of-service parameters corresponding to sidelink logical channels and logical channel prioritization restrictions parameters.

The processor further implements the following step when executing the program: after acquiring a mapping relationship, configured by the resource allocation management node, between quality-of-service parameters corresponding to sidelink logical channels and logical channel prioritization restrictions parameters by the terminal, determining the mapping relationship between logical channels and logical channel prioritization restrictions parameters according to the quality-of-service parameters corresponding to sidelink logical channels and according to the mapping relationship between the quality-of-service parameters corresponding to the sidelink logical channels and the logical channel prioritization restrictions parameters.

The processor further implements the following steps when executing the program: determining a mapping relationship between logical channels and a first part of logical channel prioritization restrictions parameters; acquiring a mapping relationship, configured by a resource allocation management node, between logical channels and a second part of logical channel prioritization restrictions parameters.

The first part of logical channel prioritization restrictions parameters includes at least one of following parameters: a list of radio access technologies allowed to be used at a sidelink by a logical channel; a list of resource types allowed to be used at a sidelink by a logical channel; a list of subcarrier spacings allowed to be used at a sidelink by a logical channel; a maximum length of a transmission time interval allowed to be used at a sidelink by a logical channel; whether pre-configured resources are allowed to be used at a sidelink by a logical channel; wherein the second part of logical channel prioritization restrictions parameters are parameters, other than the first part of logical channel prioritization restrictions parameters, of the logical channel prioritization restrictions parameters.

The radio access technologies include at least one of following: a sidelink radio access technology based on 4G LTE Rel-14; a sidelink radio access technology based on 4G LTE Rel-15; a sidelink radio access technology based on 5G NR.

The resource types include unicast resources, multicast resources and broadcast resources; or broadcast resources and a set of unicast resources and multicast resources; or unicast resources and a set of multicast resources and broadcast resources.

The processor further implements the following step when executing the program: if a resource allocation mode selected by the terminal itself is used for the sidelink, determining that a target resource in a resource pool corresponding to the sidelink is the sidelink grant; if a scheduled resource allocation mode is used for the sidelink, receiving the sidelink grant, allocated by a resource allocation management node, corresponding to the sidelink.

The processor further implements the following steps when executing the program: determining one or more first logical channels capable of using the sidelink grant, based on the sidelink grant and the mapping relationship between sidelink logical channels and logical channel prioritization restrictions parameters; determining one or more target logical channels satisfying a preset condition among the one or more first logical channels; allocating resources for the one or more target logical channels.

The processor further implements the following steps when executing the program: determining one or more second logical channels, in the sidelink, having a data transmission requirement; determining the one or more second logical channels as the one or more first logical channels, if the sidelink grant meets a requirement of logical channel prioritization restrictions parameters corresponding to the one or more second logical channels.

The processor further implements the following steps when executing the program: determining one or more logical channels with a highest priority among the one or more first logical channels; determining a target identifier corresponding to the one or more logical channels with the highest priority; determining one or more logical channels corresponding to the target identifier in the one or more first logical channels as the one or more target logical channels.

The processor further implements the following step when executing the program: allocating resources to logical channels in the one or more target logical channels sequentially in a descending order of priorities of the one or more target logical channels from high to low.

To achieve the above objective, the embodiments of the present disclosure further provide a terminal. The terminal includes: a first determination module, configured to determine a sidelink grant; a resource allocation module, configured to allocating resources to sidelink logical channels according to the sidelink grant and a mapping relationship between sidelink logical channels and logical channel prioritization restrictions parameters.

The logical channel prioritization restrictions parameters include at least one of following parameters: a list of radio access technologies allowed to be used at a sidelink by a logical channel; a list of resource types allowed to be used at a sidelink by a logical channel; a list of subcarrier spacings allowed to be used at a sidelink by a logical channel; a maximum length of a transmission time interval allowed to be used at a sidelink by a logical channel; whether pre-configured resources are allowed to be used at a sidelink by a logical channel.

The terminal further includes: a second determination module, configured to determine the mapping relationship between logical channels and logical channel prioritization restrictions parameters.

The terminal further includes: a first acquisition module, configured to 0 acquire the mapping relationship, configured by a resource allocation management node, between logical channels and logical channel prioritization restrictions parameters.

The first acquisition module includes: a first information report unit, configured to report logical channels of each sidelink and radio access technologies and/or resource types corresponding to the logical channels of each sidelink to the resource allocation management node; or, a second information report unit, configured to report logical channels of each sidelink and quality-of-service parameters corresponding to the logical channels of each sidelink to the resource allocation management node; a mapping relationship acquisition unit, configured to acquire the mapping relationship, configured by the resource allocation management node, between logical channels and logical channel prioritization restrictions parameters.

The terminal further includes a second acquisition module, configured to acquire a mapping relationship, configured by the resource allocation management node, between quality-of-service parameters corresponding to sidelink logical channels and logical channel prioritization restrictions parameters.

The terminal further includes: a third determination module, configured to determine the mapping relationship between logical channels and logical channel prioritization restrictions parameters according to the quality-of-service parameters corresponding to sidelink logical channels and according to the mapping relationship between the quality-of-service parameters corresponding to the sidelink logical channels and the logical channel prioritization restrictions parameters.

The terminal further includes: a fourth determination module, configured to determine a mapping relationship between logical channels and a first part of logical channel prioritization restrictions parameters; a third acquisition module, configured to acquire a mapping relationship, configured by a resource allocation management node, between logical channels and a second part of logical channel prioritization restrictions parameters.

The first part of logical channel prioritization restrictions parameters includes at least one of following parameters: a list of radio access technologies allowed to be used at a sidelink by a logical channel; a list of resource types allowed to be used at a sidelink by a logical channel; a list of subcarrier spacings allowed to be used at a sidelink by a logical channel; a maximum length of a transmission time interval allowed to be used at a sidelink by a logical channel; whether pre-configured resources are allowed to be used at a sidelink by a logical channel; wherein the second part of logical channel prioritization restrictions parameters are parameters, other than the first part of logical channel prioritization restrictions parameters, of the logical channel prioritization restrictions parameters.

The radio access technologies include at least one of following: a sidelink radio access technology based on 4G LTE Rel-14; a sidelink radio access technology based on 4G LTE Rel-15; a sidelink radio access technology based on 5G NR.

The resource types include unicast resources, multicast resources and broadcast resources; or broadcast resources and a set of unicast resources and multicast resources; or unicast resources and a set of multicast resources and broadcast resources.

The first determination module includes: a first determination unit, configured to, if a resource allocation mode selected by the terminal itself is used for the sidelink, determine that a target resource in a resource pool corresponding to the sidelink is the sidelink grant; a reception unit, configured to, if a scheduled resource allocation mode is used for the sidelink, receive the sidelink grant, allocated by a resource allocation management node, corresponding to the sidelink.

The resource allocation module includes: a second determination unit, configured to determine one or more first logical channels capable of using the sidelink grant, based on the sidelink grant and the mapping relationship between sidelink logical channels and logical channel prioritization restrictions parameters; a third determination unit, configured to determine one or more target logical channels satisfying a preset condition among the one or more first logical channels; a resource allocation unit, configured to allocate resources for the one or more target logical channels.

The second determination unit is specifically configured to: determine one or more second logical channels, in the sidelink, having a data transmission requirement; determine the one or more second logical channels as the one or more first logical channels, if the sidelink grant meets a requirement of logical channel prioritization restrictions parameters corresponding to the one or more second logical channels.

The third determination unit is specifically configured to: determine one or more logical channels with a highest priority among the one or more first logical channels; determine a target identifier corresponding to the one or more logical channels with the highest priority; determine one or more logical channels corresponding to the target identifier in the one or more first logical channels as the one or more target logical channels.

The resource allocation unit is specifically configured to: allocate resources to logical channels in the one or more target logical channels sequentially in a descending order of priorities of the one or more target logical channels from high to low.

To achieve the above objective, the embodiments of the present disclosure further provide a computer readable storage medium, having a program stored on the computer readable storage medium, wherein when the program is executed by a processor, the processor implements steps of the resource allocation method.

To achieve the above objective, the embodiments of the present disclosure further provide a node device. The node device includes: a transceiver, a storage, a processor, and a program stored on the storage and executable by the processor, wherein the processor implements following steps: configuring a mapping relationship between sidelink logical channels and at least part of logical channel prioritization restrictions parameters for a terminal, or configuring a mapping relationship between quality-of-service parameters corresponding to sidelink logical channels and logical channel prioritization restrictions parameters for a terminal; feeding the mapping relationship back to the terminal.

The processor further implements the following steps when executing the program: receiving logical channels of each sidelink and radio access technologies and/or resources type corresponding to the logical channels of each sidelink reported by the terminal, or receiving logical channels of each sidelink and quality-of-service parameters corresponding to the logical channels of each sidelink reported by the terminal; configuring the mapping relationship between the sidelink logical channels and at least part of logical channel prioritization restrictions parameters for the terminal.

The logical channel prioritization restrictions parameters include at least one of following parameters: a list of radio access technologies allowed to be used at a sidelink by a logical channel; a list of resource types allowed to be used at a sidelink by a logical channel; a list of subcarrier spacings allowed to be used at a sidelink by a logical channel; a maximum length of a transmission time interval allowed to be used at a sidelink by a logical channel; whether pre-configured resources are allowed to be used at a sidelink by a logical channel.

The radio access technologies include at least one of following: a sidelink radio access technology based on 4G LTE Rel-14; a sidelink radio access technology based on 4G LTE Rel-15; a sidelink radio access technology based on 5G NR.

The resource types include unicast resources, multicast resources and broadcast resources; or broadcast resources and a set of unicast resources and multicast resources; or unicast resources and a set of multicast resources and broadcast resources.

To achieve the above objective, the embodiments of the present disclosure further provide a node device. The node device includes: a first configuration module, configured to configure a mapping relationship between sidelink logical channels and at least part of logical channel prioritization restrictions parameters for a terminal; or, a second configuration module, configured to configure a mapping relationship between quality-of-service parameters corresponding to sidelink logical channels and logical channel prioritization restrictions parameters for a terminal; a feedback module, configured to feed the mapping relationship back to the terminal.

The first configuration module includes: a first reception unit, configured to receive logical channels of each sidelink and radio access technologies and/or resources type corresponding to the logical channels of each sidelink reported by the terminal; or, a second reception unit, configured to receive logical channels of each sidelink and quality-of-service parameters corresponding to the logical channels of each sidelink reported by the terminal; a configuration unit, configured to configure the mapping relationship between the sidelink logical channels and at least part of logical channel prioritization restrictions parameters for the terminal.

The logical channel prioritization restrictions parameters include at least one of following parameters: a list of radio access technologies allowed to be used at a sidelink by a logical channel; a list of resource types allowed to be used at a sidelink by a logical channel; a list of subcarrier spacings allowed to be used at a sidelink by a logical channel; a maximum length of a transmission time interval allowed to be used at a sidelink by a logical channel; whether pre-configured resources are allowed to be used at a sidelink by a logical channel.

The radio access technologies include at least one of following: a sidelink radio access technology based on 4G LTE Rel-14; a sidelink radio access technology based on 4G LTE Rel-15; a sidelink radio access technology based on 5G NR.

The resource types include unicast resources, multicast resources and broadcast resources; or broadcast resources and a set of unicast resources and multicast resources; or unicast resources and a set of multicast resources and broadcast resources.

To achieve the above objective, the embodiments of the present disclosure further provide a computer readable storage medium having a program stored on the computer readable storage medium, wherein when the program is executed by a processor, the processor implements steps of the above resource allocation method.

The technical solutions of the present disclosure have at least following beneficial effects.

In the technical solutions of the embodiments of the present disclosure, a sidelink grant is determined, a resource is allocated to the logical channel of the sidelink according to the sidelink grant and the mapping relationship between sidelink logical channels and logical channel prioritization restrictions parameters. In this way, after the terminal receives the sidelink grant, the terminal can arrange a data packet on the sidelink, and allocate a resource to a logical channel of the sidelink.

DETAILED DESCRIPTION

In order to make technical problems to be addressed by the present disclosure, technical solutions and advantages of the present disclosure more apparent, a detailed description will be given below with reference to the drawings and specific embodiments.

Figure 1:
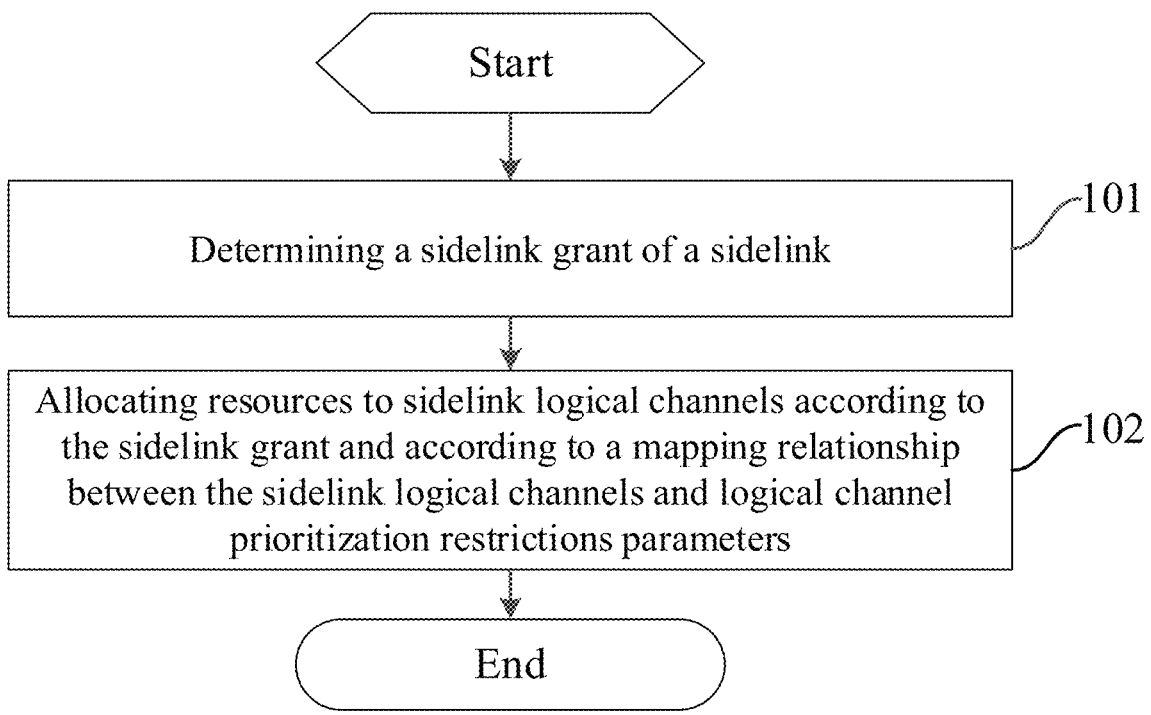
FIG. 1 is a first flow chart of a resource allocation method according to an embodiment of the present disclosure.

As shown in FIG. 1, an embodiment of the present disclosure provides a resource allocation method performed by a terminal. The method includes steps 101 and 102.

Step 101: determining a sidelink grant.

In this step, optionally, a sidelink is a sidelink of the NR system.

Step 102: allocating a resource to a logical channel of the sidelink according to the sidelink grant and according to a mapping relationship between sidelink logical channels and logical channel prioritization restrictions parameters.

In the resource allocation method of the embodiment of the present disclosure, a sidelink grant is determined, a resource is allocated to the logical channel of the sidelink according to the sidelink grant and the mapping relationship between sidelink logical channels and logical channel prioritization restrictions parameters. In this way, after the terminal receives the sidelink grant, the terminal can arrange a data packet on the sidelink, and allocate a resource to a logical channel of the sidelink.

Optionally, the logical channel prioritization restrictions (LCP restrictions) parameters include, but are not limited to, at least one of the following parameters: a list of radio access technologies allowed to be used at a sidelink by a logical channel; a list of resource types allowed to be used at a sidelink by a logical channel; a list of subcarrier spacings (SCS) allowed to be used at a sidelink by a logical channel; a maximum length of a transmission time interval (TTI) allowed to be used at a sidelink by a logical channel; whether pre-configured resources are allowed to be used at a sidelink by a logical channel.

Here, further, pre-configured resources may be further divided into Type 1 and Type 2, and are respectively used as indications of logical channel prioritization restrictions parameters.

Specifically, a radio access technology includes, but is not limited to, at least one of the following: a sidelink radio access technology based on 4G LTE Rel-14; a sidelink radio access technology based on 4G LTE Rel-15; a sidelink radio access technology based on 5G NR.

Specifically, resource types include unicast resources, multicast resources and broadcast resources; or broadcast resources and a set of unicast resources and multicast resources; or unicast resources and a set of multicast resources and broadcast resources.

It should be noted that multicast/broadcast resources may also be multicast resources.

In some optional embodiments of the present disclosure, the method may further include a step of: determining a mapping relationship between logical channels and logical channel prioritization restrictions parameters.

It should be noted that, in this embodiment, the terminal determines the mapping relationship between logical channels and logical channel prioritization restrictions parameters. That is, the mapping relationship between logical channels and logical channel prioritization restrictions parameters is determined by the terminal itself.

Specifically, determining the mapping relationship between the logical channels and the logical channel prioritization restrictions parameters may include: determining the mapping relationship between the logical channels and the logical channel prioritization restrictions parameters through a higher layer of a terminal; or determining the mapping relationship between the logical channels and the logical channel prioritization restrictions parameters based on indication information of a higher layer through a Media Access Control (MAC) layer or an Radio Resource Control (RRC) layer of a terminal; or determining the mapping relationship between the logical channels and the logical channel prioritization restrictions parameters by the MAC layer or the RRC layer of the terminal itself.

Here, for example, the indication information of the higher layer may include: correspondence relationship between a service and a radio access technology and/or a mapping relationship between a service and a resource allocation type.

In some other optional embodiments of the present disclosure, the method may further include the step of: acquiring a mapping relationship between logical channels and logical channel prioritization restrictions parameters configured by a resource allocation management node.

In this step, the resource allocation management node includes a network side device or a group header device.

It should be noted that the group header device may specifically be a terminal, and the terminal serves as a group header in a group of a device-to-device communication group. In a case that an interface Uu of a terminal adopts a single connection, a network side device may be a serving base station; in a case that the interface Uu of the terminal adopts multiple connections, the network side device may be any device that can transmit an RRC reconfiguration signaling. For example, if only a master node (MN) can send an RRC reconfiguration signaling, then the network side device refers to an MN; if only a secondary node (SN) can send an RRC reconfiguration signaling, then the network side device refers to SN; if both the MN and the SN can send the RRC reconfiguration signaling, the network side device can be either the MN or the SN.

The device-to-device communication group includes at least two terminals.

Here, specifically, acquiring the mapping relationship between the logical channels and the logical channel prioritization restrictions parameters configured by the resource allocation management node may include the following steps of: reporting logical channels of each sidelink and radio access technologies and/or resource types corresponding to the logical channels of each sidelink to the resource allocation management node, or reporting the logical channels of each sidelink and Quality of Service (QoS) parameters corresponding to the logical channels of each sidelink to the resource allocation management node; acquiring a mapping relationship between logical channels and logical channel prioritization restrictions parameters configured by the resource allocation management node.

Here, specifically, the radio access technologies include, but are not limited to, at least one of the following: a sidelink radio access technology based on 4G LTE Rel-14; a sidelink radio access technology based on 4G LTE Rel-15; a sidelink radio access technology based on 5G NR.

Specifically, the resource types include unicast resources, multicast resources and broadcast resources; or broadcast resources and a set of unicast resources and multicast resources; or unicast resources and a set of multicast resources and broadcast resources.

It should be noted that multicast/broadcast resources may also be multicast resources.

In this step, it should be noted that the terminal acquires the mapping relationship between the logical channels and the logical channel prioritization restrictions parameters, configured by the resource allocation management node based on the logical channels of each sidelink and the radio access technologies and/or the resource types corresponding to the logical channels of each sidelink, or based on the logical channels of each sidelink and the QoS parameters corresponding to the logical channels of each sidelink.

In some other optional embodiments of the present disclosure, the method may further include the following step of: acquiring a mapping relationship between Quality of Service (QoS) parameters corresponding to sidelink logical channels and logical channel prioritization restrictions parameters configured by the resource allocation management node.

Further, after the above steps, the method may further include the following step of: according to the QoS parameters corresponding to the sidelink logical channels and according to the mapping relationship between the QoS parameters corresponding to the sidelink logical channels and the logical channel prioritization restrictions parameters, determining a mapping relationship between the logical channels and the logical channel prioritization restrictions parameters.

It should be noted that the terminal determines the mapping relationship between the logical channels and the LCP restrictions parameters according to the QoS parameters corresponding to the sidelink logical channels and the mapping relationship between the QoS parameters and the LCP restrictions parameters.

Optionally, in still further optional embodiments of the present disclosure, the method may further include following steps of: determining a mapping relationship between logical channels and a first part of logical channel prioritization restrictions parameters; acquiring a mapping relationship between logical channels and a second part of logical channel prioritization restrictions parameters configured by the resource allocation management node.

That is, the mapping relationship between the logical channels and the logical channel prioritization restrictions parameters is determined partly by the terminal and partly by the resource allocation management node.

Here, optionally, the first part of the logical channel prioritization restrictions parameters includes, but is not limited to, at least one of the following parameters: a list of radio access technologies allowed to be used at a sidelink by a logical channel; a list of resource types allowed to be used at a sidelink by a logical channel; a list of subcarrier spacings allowed to be used at a sidelink by a logical channel; a maximum length of a transmission time interval allowed to be used at a sidelink by a logical channel; whether pre-configured resources are allowed to be used at a sidelink by a logical channel; wherein the second part of logical channel prioritization restrictions parameters are parameters, other than the first part of the logical channel prioritization restrictions parameters, of the logical channel prioritization restrictions parameters.

That is, in this embodiment, the logical channel prioritization restrictions parameters include the first part of logical channel prioritization restrictions parameters and the second part of logical channel prioritization restrictions parameters. Parameters in the first part of logical channel prioritization restrictions parameters are different from parameters in the second part of logical channel prioritization restrictions parameters.

Here, specifically, the radio access technologies include, but are not limited to, at least one of the following: a sidelink radio access technology based on 4G LTE Rel-14; a sidelink radio access technology based on 4G LTE Rel-15; a sidelink radio access technology based on 5G NR.

Specifically, resource types include unicast resources, multicast resources and broadcast resources; or broadcast resources and a set of unicast resources and multicast resources; or unicast resources and a set of multicast resources and broadcast resources.

It should be noted that multicast/broadcast resources may also be multicast resources.

Based on the embodiment shown in FIG. 1, as an optional implementation, Step 101 may specifically include the following steps: if a resource allocation mode selected by the terminal itself is used for the sidelink, determining that a target resource in a resource pool corresponding to the sidelink is a sidelink grant; if a scheduled resource allocation mode is used for the sidelink, receiving a sidelink grant allocated by the resource allocation management node.

Based on the embodiment shown in FIG. 1, as an optional implementation, Step 102 may specifically include the following step of: determining one or more first logical channels capable of using the sidelink grant, based on the sidelink grant and the mapping relationship between sidelink logical channels and logical channel prioritization restrictions parameters.

In this step, for the sidelink grant of each sidelink, according to the mapping relationship between the sidelink logical channels and the logical channel prioritization restrictions parameters, selecting one or more first logical channels capable of using the sidelink grant.

Optionally, this step may specifically include the following steps: determining one or more second logical channels, in the sidelink, having a data transmission requirement; determining the one or more second logical channels as the one or more first logical channels if the sidelink grant meets a requirement of logical channel prioritization restrictions parameters corresponding to the one or more second logical channels.

That is, the one or more first logical channels capable of using the sidelink grant needs to satisfy all logical channel prioritization restrictions corresponding to the one or more first logical channels.

Specifically, if the LCP restrictions are configured with a radio access technology list, then the radio access technology corresponding to the sidelink grant needs to be included in the radio access technology list configured for the LCP restrictions; if the LCP restrictions are configured with a resource type list, then the resource type corresponding to the sidelink grant needs to be included in the resource type list configured for the LCP restrictions; if the LCP restrictions are configured with a subcarrier spacing list allowed to be used, a subcarrier spacing of a resource corresponding to the sidelink grant needs to be included in the subcarrier interval list configured for the LCP restrictions; if the LCP restrictions are configured with a maximum TTI length allowed to be used, a TTI length such as a PSSCH (Physical Sidelink Shared Channel) duration corresponding to the sidelink grant needs to be less than or equal to the maximum TTI length configured for the LCP restrictions; if the LCP restrictions are configured with whether pre-configured resources are allowed to be used, such as a Type 1 resource and the current sidelink uses the Type 1 resource, only the logical channel configured to be allowed to use the resource in the LCP restrictions may use the resource.

The method may further includes determining one or more target logical channels satisfying a preset condition among the one or more first logical channels.

Optionally, this step may specifically include the following: determining one or more logical channels with the highest priority among the one or more first logical channels.

In this step, specifically, the terminal selects the logical channel with the highest priority from the one or more first logical channels.

Optionally, this step may specifically include the following: determining a target identifier corresponding to the logical channel with the highest priority.

In this step, it should be noted that each logical channel corresponds to an identifier, and identifiers corresponding to different logical channels may be the same or different.

Here, it should further be noted that there is at least one logical channel with the highest priority determined from the one or more first logical channels.

When the number of logical channels with the highest priority is greater than or equal to two, and different identifiers exist in identifiers corresponding to the logical channels with the highest priority, the terminal selects one of the identifiers as the target identifier.

Optionally, this step may specifically include the following: determining one or more logical channels corresponding to the target identifier in the one or more first logical channels as one or more target logical channels.

In this step, it should be noted that the one or more target logical channels include one or more logical channels with the highest priority corresponding to the target identifier and another logical channel corresponding to the target identifier, other than the one or more logical channels with the highest priority corresponding to the target identifier, among the one or more first logical channels.

Optionally, this step may specifically include the following: allocating resources for the one or more target logical channels.

Here, optionally, this step may specifically include the following: allocating resources to logical channels in the one or more target logical channels sequentially in a descending order of priorities of the target logical channels from high to low.

In the resource allocation method of the embodiment of the present disclosure, a sidelink grant is determined, resources are allocated to sidelink logical channels according to the sidelink grant and the mapping relationship between the sidelink logical channels and the logical channel prioritization restrictions parameters. In this way, after the terminal receives the sidelink grant, the terminal can arrange a data packet on the sidelink, and allocate resources to the sidelink logical channels.

A specific implementation process of the resource allocation method of the present disclosure is specifically described below in connection with four examples.

EXAMPLE 1

In this example, the resource allocation method specifically includes the following steps.

Step a1: determining, by the terminal, a mapping relationship between logical channels and logical channel prioritization restrictions parameters.

Here, the mapping relationship between the logical channels and the logical channel prioritization restrictions parameters is determined by the terminal itself.

Specifically, determining the mapping relationship between the logical channels and the logical channel prioritization restrictions parameters may include: determining the mapping relationship between the logical channels and the logical channel prioritization restrictions parameters through a higher layer of a terminal; or determining the mapping relationship between the logical channels and the logical channel prioritization restrictions parameters based on indication information of a higher layer through a MAC layer or an RRC layer of a terminal; or determining the mapping relationship between the logical channels and the logical channel prioritization restrictions parameters by the MAC layer or the RRC layer of the terminal itself.

Here, for example, the indication information of the higher layer may include: correspondence relationship between a service and a radio access technology and/or a mapping relationship between a service and a resource allocation type.

Here, the LCP restrictions parameters include, but are not limited to, at least one of the following parameters: a list of radio access technologies allowed to be used at a sidelink by a logical channel; a list of resource types allowed to be used at a sidelink by a logical channel; a list of subcarrier spacings allowed to be used at a sidelink by a logical channel; a maximum length of a transmission time interval allowed to be used at a sidelink by a logical channel; whether pre-configured resources are allowed to be used at a sidelink by a logical channel.

Here, further, pre-configured resources may be further divided into Type 1 and Type 2, and are respectively used as indications of logical channel prioritization restrictions parameters.

The radio access technologies include, but are not limited to, at least one of the following: a sidelink radio access technology based on 4G LTE Rel-14; a sidelink radio access technology based on 4G LTE Rel-15; a sidelink radio access technology based on 5G NR.

Here, the resource types include unicast resources, multicast resources and broadcast resources; or broadcast resources and a set of unicast resources and multicast resources; or unicast resources and a set of multicast resources and broadcast resources.

It should be noted that multicast/broadcast resources may also be multicast resources.

Step b1: determining, by the terminal, a sidelink grant.

Here, for a resource allocation mode selected by the terminal itself, the terminal may directly select resources from a resource pool corresponding to the sidelink, and take the selected resources as the sidelink grant of the terminal.

For a scheduled resource allocation mode, the terminal may acquire a sidelink grant assigned to the terminal by the resource allocation management node (the network side device or the group header).

Step c1: performing a LCP process for the sidelink grant, and arranging a MAC PDU of the sidelink.

Here, in response to the sidelink grant of each sidelink, resource allocation may be performed according to the following step c11.

Step c11: for the sidelink grant, selecting a logical channel of the sidelink capable of using the sidelink grant based on the LCP restrictions parameters of logical channels.

Here, first, logical channels, having a data transmission requirement, of the sidelink are determined. Then, a logical channel capable of using the sidelink grant is determined from the logical channels having the data transmission requirements.

It should be noted that the logical channel capable of using the sidelink grant needs to satisfy all LCP restrictions corresponding to the logical channel.

Here, a specific implementation procedure that the logical channel capable of using the sidelink grant needs to satisfy all the LCP restrictions corresponding to the logical channel, may be obtained by referring to detailed implementation of the Step 102 in the above optional implementation and will not described here.

Step c12: for the sidelink grant, determining, from sidelink logical channels capable of using the sidelink grant, a target logical channel satisfying a preset condition.

Here, specifically, from the logical channels, determined in Step c11, of the sidelink capable of using the sidelink grant, a logical channel having the highest priority is selected, and a target identifier corresponding to the logical channel having the highest priority is determined; and a logical channel corresponding to the target identifier among sidelink logical channels capable of using the sidelink grant is determined as a target logical channel.

It should be noted that each logical channel corresponds to an identifier, and identifiers corresponding to different logical channels may be the same or different.

Here, it should further be noted that there is at least one logical channel having the highest priority determined from among sidelink logical channels capable of using the sidelink grant.

When the number of logical channels having the highest priority is greater than or equal to two, and different identifiers exist in the identifiers corresponding to the logical channels, the terminal may select one of the identifiers as the target identifier.

Step c13: allocating resources to the target logical channel.

Here, specifically, resources are allocated to logical channels in the target logical channels in a descending order of priorities of the target logical channels, until the resources are exhausted, or resources are allocated to data in all logical channels corresponding to the target identifier.

EXAMPLE 2

In this example, the resource allocation method specifically includes the following steps.

Step a2: determining, by the terminal, a mapping relationship between logical channels and logical channel prioritization restrictions parameters configured by a resource allocation management node.

Here, the mapping relationship between the logical channels and the logical channel prioritization restrictions parameters is completely determined by the resource allocation management node (a network side device or a group header).

Specifically, directly configuring the mapping relationship between the logical channels and the logical channel prioritization restrictions parameters by the resource allocation management node may specifically include: reporting logical channels of each sidelink and radio access technologies and/or resource types corresponding to the logical channels of each sidelink to the resource allocation management node by the terminal; or, reporting the logical channels of each sidelink and QoS parameters corresponding to the logical channels of each sidelink to the resource allocation management node by the terminal; configuring the mapping relationship between the logical channels and the logical channel prioritization restrictions parameters for the terminal by the resource allocation management node based on the logical channels of each sidelink and the radio access technologies and/or resource types corresponding to the logical channels of each sidelink, or based on the logical channels of each sidelink and the QoS parameters corresponding to the logical channels of each sidelink.

Finally, the terminal acquires a mapping relationship between the logical channels and the logical channel prioritization restrictions parameters configured by the resource allocation management node.

Here, the LCP restrictions parameters include, but are not limited to, at least one of the following parameters: a list of radio access technologies allowed to be used at a sidelink by a logical channel; a list of resource types allowed to be used at a sidelink by a logical channel; a list of subcarrier spacings allowed to be used at a sidelink by a logical channel; a maximum length of a transmission time interval allowed to be used at a sidelink by a logical channel; whether pre-configured resources are allowed to be used at a sidelink by a logical channel.

Here, further, pre-configured resources may be further divided into a Type 1 resource and a Type 2 resource, and are respectively used as indications of logical channel prioritization restrictions parameters.

The radio access technologies include, but are not limited to, at least one of the following: a sidelink radio access technology based on 4G LTE Rel-14; a sidelink radio access technology based on 4G LTE Rel-15; a sidelink radio access technology based on 5G NR.

Here, the resource types include unicast resources, multicast resources and broadcast resources; or broadcast resources and a set of unicast resources and multicast resources; or unicast resources and a set of multicast resources and broadcast resources.

It should be noted that multicast/broadcast resources may also be multicast resources.

Step b2: determining the sidelink grant by the terminal.

Step c2: performing the LCP process for the sidelink grant, and arranging a sidelink MAC PDU.

The specific implementations of the Step b2 and the Step c2 can be obtained by referring to Example 1, which is not repeated here.

EXAMPLE 3

In this example, the resource allocation method specifically includes the following steps.

Step a3: acquiring, by the terminal, a mapping relationship between the logical channels and the logical channel prioritization restrictions parameters configured by the resource allocation management node.

Here, the mapping relationship between the logical channels and the logical channel prioritization restrictions parameters is completely determined by the resource allocation management node (a network side device or a group header).

Specifically, directly configuring the mapping relationship between the logical channels and the logical channel prioritization restrictions parameters by the resource allocation management node may specifically include: directly configuring a mapping relationship between QoS parameters corresponding to sidelink logical channels and logical channel prioritization restrictions parameters by the resource allocation management node; determining the mapping relationship between the logical channels and the logical channel prioritization restrictions parameters by the terminal based on the mapping relationship between QoS parameters corresponding to sidelink logical channels and logical channel prioritization restrictions parameters.

Here, the LCP restrictions parameters include, but are not limited to, at least one of the following parameters: a list of radio access technologies allowed to be used at a sidelink by a logical channel; a list of resource types allowed to be used at a sidelink by a logical channel; a list of subcarrier spacings allowed to be used at a sidelink by a logical channel; a maximum length of a transmission time interval allowed to be used at a sidelink by a logical channel; whether pre-configured resources are allowed to be used at a sidelink by a logical channel.

Here, further, pre-configured resources may be further divided into a Type 1 resource and a Type 2 resource, and are respectively used as indications of logical channel prioritization restrictions parameters.

The radio access technologies include, but are not limited to, at least one of the following: a sidelink radio access technology based on 4G LTE Rel-14; a sidelink radio access technology based on 4G LTE Rel-15; a sidelink radio access technology based on 5G NR.

Here, the resource types include unicast resources, multicast resources and broadcast resources; or broadcast resources and a set of unicast resources and multicast resources; or unicast resources and a set of multicast resources and broadcast resources.

It should be noted that multicast/broadcast resources may also be multicast resources.

Step b3: determining the sidelink grant by the terminal.

Step c3: performing the LCP process for the sidelink grant, and arranging a sidelink MAC PDU.

The specific implementations of the Step b3 and the Step c3 can be obtained by referring to Example 1, which is not repeated here.

EXAMPLE 4

In this example, the resource allocation method specifically includes the following steps.

Step a4: determining a mapping relationship between logical channels and a first part of logical channel prioritization restrictions parameters; and acquiring a mapping relationship between logical channels and a second part of logical channel prioritization restrictions parameters configured by the resource allocation management node.

Here, the mapping relationship between the logical channels and the logical channel prioritization restrictions parameters is determined partly by the terminal and partly by the resource allocation management node.

The first part of the LCP restrictions parameters determined by the terminal includes, but is not limited to, at least one of the following parameters: a list of radio access technologies allowed to be used at a sidelink by a logical channel; a list of resource types allowed to be used at a sidelink by a logical channel; a list of subcarrier spacings allowed to be used at a sidelink by a logical channel; a maximum length of a transmission time interval allowed to be used at a sidelink by a logical channel; whether pre-configured resources are allowed to be used at a sidelink by a logical channel.

Here, further, pre-configured resources may be further divided into a Type 1 resource and a Type 2 resource, and are respectively used as indications of logical channel prioritization restrictions parameters.

The radio access technologies include, but are not limited to, at least one of the following: a sidelink radio access technology based on 4G LTE Rel-14; a sidelink radio access technology based on 4G LTE Rel-15; a sidelink radio access technology based on 5G NR.

Here, the resource types include unicast resources, multicast resources and broadcast resources; or broadcast resources and a set of unicast resources and multicast resources; or unicast resources and a set of multicast resources and broadcast resources.

It should be noted that multicast/broadcast resources may also be multicast resources.

The second part of LCP restrictions parameters includes at least one of parameters, other than the first part of the LCP restrictions parameters, of all parameters.

Here, the mapping relationship between the logical channels and the first part of logical channel prioritization restrictions parameters is determined by the terminal, and a specific implementation thereof may be obtained by referring to Step a1 in the above Example 1, which is not described here.

The mapping relationship between the logical channels and the second part of logical channel prioritization restrictions parameters is configured by the resource allocation management node, and a specific implementation thereof may be obtained by referring to Step a2 in Example 2 or Step a3 in Example 3, which is not repeated here.

Step b4: determining the sidelink grant by the terminal.

Step c4: performing the LCP process for the sidelink grant, and arranging a sidelink MAC PDU.

The specific implementations of the Step b4 and the Step c4 can be obtained by referring to Example 1, which is not repeated here.

Figure 2:
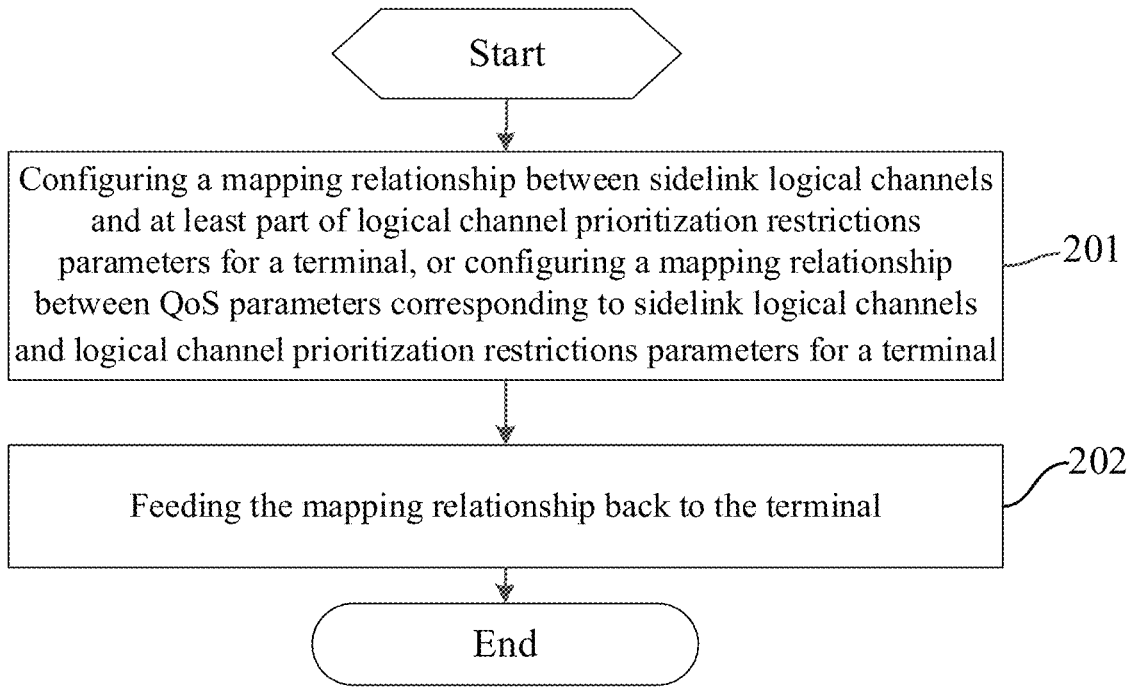
FIG. 2 is a second flowchart of a resource allocation method according to an embodiment of the present disclosure.

As shown in FIG. 2, the embodiment of the present disclosure also provides a resource allocation method, which is performed by a node device, and includes steps 201 and 202.

Step 201: configuring a mapping relationship between sidelink logical channels and at least part of logical channel prioritization restrictions parameters for a terminal, or configuring a mapping relationship between QoS parameters corresponding to sidelink logical channels and logical channel prioritization restrictions parameters for a terminal.

Here, the node device is a resource allocation management node device. It should be noted that the node device includes a network side device or a group header.

It should be noted that the group header device may specifically be a terminal, and the terminal serves as a group header in a group of a device-to-device communication group. In a case that an interface Uu of a terminal adopts a single connection, a network side device may be a serving base station; in a case that the interface Uu of the terminal adopts multiple connections, the network side device may be any device that can transmit an RRC reconfiguration signaling. For example, if only a master node (MN) can send an RRC reconfiguration signaling, then the network side device refers to an MN; if only a secondary node (SN) can send an RRC reconfiguration signaling, then the network side device refers to SN; if both the MN and the SN can send the RRC reconfiguration signaling, the network side device can be either the MN or the SN.

The device-to-device communication group includes at least two terminals.

Here, it should further be noted that the mapping relationship between sidelink logical channels and logical channel prioritization restrictions parameters may be configured entirely by the node device or partially by the node device.

Step 202: feeding the mapping relationship back to the terminal.

Here, the mapping relationship corresponds to step 201, and may be the mapping relationship between the sidelink logical channels and at least part of the logical channel prioritization restrictions parameters, or the mapping relationship between QoS parameters corresponding to sidelink logical channels and logical channel prioritization restrictions parameters.

In the resource allocation method of the embodiment of the present disclosure, a mapping relationship between sidelink logical channels and at least part of logical channel prioritization restrictions parameters is configured for a terminal, or a mapping relationship between QoS parameters corresponding to sidelink logical channels and logical channel prioritization restrictions parameters is configured for the terminal, and the mapping relationship is fed back to the terminal. In this way, after the terminal receives the sidelink grant, the terminal can arrange a packet on the sidelink, and allocate resources for sidelink logical channels.

Optionally, the logical channel prioritization (LCP) restrictions parameters include, but are not limited to, at least one of the following parameters: a list of radio access technologies allowed to be used at a sidelink by a logical channel; a list of resource types allowed to be used at a sidelink by a logical channel; a list of subcarrier spacings allowed to be used at a sidelink by a logical channel; a maximum length of a transmission time interval (TTI) allowed to be used at a sidelink by a logical channel; whether pre-configured resources are allowed to be used at a sidelink by a logical channel.

Here, further, pre-configured resources may be further divided into a Type 1 resource and a Type 2 resource, and are respectively used as indications of logical channel prioritization restrictions parameters.

Specifically, the radio access technologies include, but are not limited to, at least one of the following: a sidelink radio access technology based on 4G LTE Rel-14; a sidelink radio access technology based on 4G LTE Rel-15; a sidelink radio access technology based on 5G NR.

Specifically, the resource types include unicast resources, multicast resources and broadcast resources; or broadcast resources and a set of unicast resources and multicast resources; or unicast resources and a set of multicast resources and broadcast resources.

It should be noted that multicast/broadcast resources may also be multicast resources.

Based on the embodiment shown in FIG. 2, in some optional embodiments of the present disclosure, Step 201 of configuring the mapping relationship between the sidelink logical channels and at least part of logical channel prioritization restrictions parameters for a terminal may specifically include the following steps: receiving logical channels of each sidelink and radio access technologies and/or resources type corresponding to the logical channels of each sidelink, reported by the terminal, or configuring the mapping relationship between QoS parameters corresponding to sidelink logical channels and logical channel prioritization restrictions parameters for a terminal includes receiving the logical channels of each sidelink and QoS parameters corresponding to the logical channels of each sidelink reported by the terminal; and configuring the mapping relationship between the sidelink logical channels and at least part of logical channel prioritization restrictions parameters for a terminal.

Here, specifically, the radio access technologies include, but are not limited to, at least one of the following: a sidelink radio access technology based on 4G LTE Rel-14; a sidelink radio access technology based on 4G LTE Rel-15; a sidelink radio access technology based on 5G NR.

Specifically, the resource types include unicast resources, multicast resources and broadcast resources; or broadcast resources and a set of unicast resources and multicast resources; or unicast resources and a set of multicast resources and broadcast resources.

It should be noted that multicast/broadcast resources may also be multicast resources.

In this step, it should be noted that the node device configures a mapping relationship between sidelink logical channels and at least part of logical channel prioritization restrictions parameters for the terminal based on the logical channels of each sidelink and the radio access technologies and/or resource types corresponding to the logical channels of each sidelink.

The terminal may determine the mapping relationship between logical channels and logical channel prioritization restrictions parameters based on QoS parameters corresponding to the logical channels of each sidelink and the mapping relationship between the QoS parameters corresponding to the sidelink logical channels and the logical channel prioritization restrictions parameters.

In the resource allocation method of the embodiment of the present disclosure, a mapping relationship between sidelink logical channels and at least part of logical channel prioritization restrictions parameters is configured for a terminal, or a mapping relationship between QoS parameters corresponding to sidelink logical channels and logical channel prioritization restrictions parameters is configured for the terminal, and the mapping relationship is fed back to the terminal. In this way, after the terminal receives the sidelink grant, the terminal can arrange a packet on the sidelink, and allocate resources for sidelink logical channels.

Figure 3:
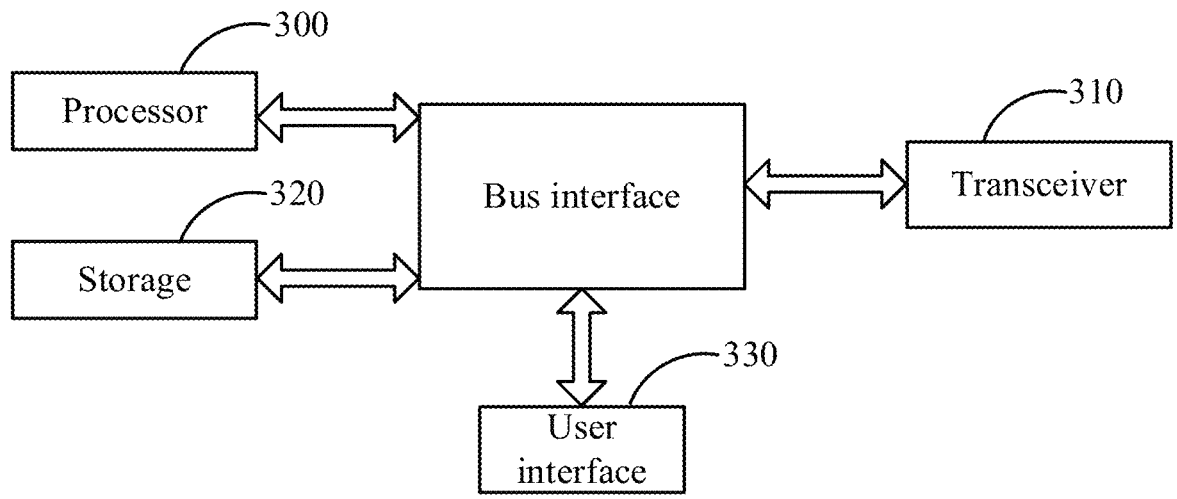
FIG. 3 is a structural block diagram of a terminal according to an embodiment of the present disclosure.

As shown in FIG. 3, the embodiment of the present disclosure further provides a terminal. The terminal includes a storage 320, a processor 300, a transceiver 310, a bus interface and a program stored on the storage 320 and executable on the processor 300, wherein the processor 300 is configured to read the program in the storage 320 and perform the following steps: determining a sidelink grant; allocating resources to sidelink logical channels according to the sidelink grant and according to a mapping relationship between sidelink logical channels and logical channel prioritization restrictions parameters.

In FIG. 3, a bus architecture may include any number of interconnected buses and bridges. Specifically, various circuits such as one or more processors represented by the processor 300 and a storage represented by the storage 320 are linked together. The bus architecture may also link together various other circuits, such as peripheral devices, voltage regulators, and power management circuits, all of which are well known in the art and thus will not be described further herein. A bus interface provides an interface. A transceiver 310 may be a plurality of elements, i.e., including a transmitter and a transceiver, for providing means for communicating with various other devices over a transmission medium. For different user devices, a user interface 330 may also be an interface capable of externally or internally interfacing with a desired device, connected devices include, but are not limited to, a keypad, a display, a speaker, a microphone, a joystick, and the like.

The processor 300 is responsible for managing the bus architecture and general processings, and the storage 320 may store data used by the processor 500 when performing operations.

Optionally, the logical channel prioritization restrictions parameters include at least one of the following parameters: a list of radio access technologies allowed to be used at a sidelink by a logical channel; a list of resource types allowed to be used at a sidelink by a logical channel; a list of subcarrier spacings allowed to be used at a sidelink by a logical channel; a maximum length of a transmission time interval allowed to be used at a sidelink by a logical channel; whether pre-configured resources are allowed to be used at a sidelink by a logical channel.

Optionally, the processor 300 may further implement the following step when executing the program: determining a mapping relationship between logical channels and logical channel prioritization restrictions parameters.

Optionally, the processor 300 may further implement the following step when executing the program: acquiring a mapping relationship between logical channels and logical channel prioritization restrictions parameters configured by a resource allocation management node.

Optionally, the processor 300 may further implement the following step when executing the program: reporting logical channels of each sidelink and radio access technologies and/or resource types corresponding to the logical channels of each sidelink to a resource allocation management node, or reporting logical channels of each sidelink and QoS parameters corresponding to the logical channels of each sidelink to the resource allocation management node; acquiring a mapping relationship between logical channels and logical channel prioritization restrictions parameters configured by the resource allocation management node.

Optionally, the processor 300 may further implement the following steps when executing the program: acquiring a mapping relationship between QoS parameters corresponding to sidelink logical channels and logical channel prioritization restrictions parameters configured by the resource allocation management node.

Optionally, the processor 300 may further implement the following step when executing the program: after acquiring the mapping relationship between QoS parameters corresponding to sidelink logical channels and logical channel prioritization restrictions parameters configured by the resource allocation management node, determining a mapping relationship between logical channels and logical channel prioritization restrictions parameters according to QoS parameters corresponding to the sidelink logical channels and the mapping relationship between QoS parameters corresponding to sidelink logical channels and logical channel prioritization restrictions parameters.

Optionally, the processor 300 may further implement the following steps when executing the program: determining a mapping relationship between logical channels and a first part of logical channel prioritization restrictions parameters; acquiring a mapping relationship between logical channels and a second part of logical channel prioritization restrictions parameters configured by a resource allocation management node.

Optionally, the first part of logical channel prioritization restrictions parameters includes at least one of the following parameters: a list of radio access technologies allowed to be used at a sidelink by a logical channel; a list of resource types allowed to be used at a sidelink by a logical channel; a list of subcarrier spacings allowed to be used at a sidelink by a logical channel; a maximum length of a transmission time interval allowed to be used at a sidelink by a logical channel; whether pre-configured resources are allowed to be used at a sidelink by a logical channel.

The second part of logical channel prioritization restrictions parameters are parameters, other than the first part of the logical channel prioritization restrictions parameters, of the logical channel prioritization restrictions parameters.

Optionally, the radio access technologies include, but are not limited to, at least one of the following: a sidelink radio access technology based on 4G LTE Rel-14; a sidelink radio access technology based on 4G LTE Rel-15; a sidelink radio access technology based on 5G NR.

Optionally, the resource types include unicast resources, multicast resources and broadcast resources; or broadcast resources and a set of unicast resources and multicast resources; or unicast resources and a set of multicast resources and broadcast resources.

Optionally, the processor 300 may further implement the following steps when executing the program: if a resource allocation mode selected by the terminal itself is used for the sidelink, determining that a target resource in a resource pool corresponding to the sidelink is a sidelink grant; if a scheduled resource allocation mode is used for the sidelink, receiving a sidelink grant allocated by the resource allocation management node.

Optionally, the processor 300 may further implement the following steps when executing the program: determining one or more first logical channels capable of using the sidelink grant, based on the sidelink grant and the mapping relationship between sidelink logical channels and logical channel prioritization restrictions parameters; determining one or more target logical channels satisfying a preset condition among the one or more first logical channels; allocating resources for the one or more target logical channels.

Optionally, the processor 300 may further implement the following steps when executing the program: determining one or more second logical channels, in the sidelink, having a data transmission requirement; determining the one or more second logical channels as the one or more first logical channels if the sidelink grant meets a requirement of logical channel prioritization restrictions parameters corresponding to the one or more second logical channels.

Optionally, the processor 300 may further implement the following steps when executing the program: determining logical channels with the highest priority among the one or more first logical channels; determining a target identifier corresponding to the logical channels with the highest priority; determining one or more logical channels corresponding to the target identifier in the one or more first logical channels as the one or more target logical channels.

Optionally, the processor 300 may further implement the following steps when executing the program: allocating resources to logical channels in the one or more target logical channels sequentially in a descending order of priorities of the target logical channels from high to low.

Figure 4:
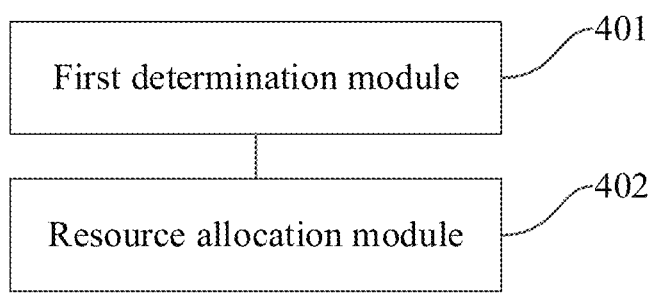
FIG. 4 is a schematic block diagram of a terminal according to an embodiment of the present disclosure.

As shown in FIG. 4, the embodiment of the present disclosure also provides a terminal. The terminal includes: a first determination module 401, configured to determine a sidelink grant; and a resource allocation module 402, configured to allocate resources to sidelink logical channels according to the sidelink grant and according to a mapping relationship between sidelink logical channels and logical channel prioritization restrictions parameters.

In the terminal of this embodiment, optionally, the logical channel prioritization restrictions parameters include at least one of the following parameters: a list of radio access technologies allowed to be used at a sidelink by a logical channel; a list of resource types allowed to be used at a sidelink by a logical channel; a list of subcarrier spacings allowed to be used at a sidelink by a logical channel; a maximum length of a transmission time interval allowed to be used at a sidelink by a logical channel; whether pre-configured resources are allowed to be used at a sidelink by a logical channel.

The terminal of this embodiment further includes a second determination module, configured to determine a mapping relationship between logical channels and logical channel prioritization restrictions parameters.

The terminal of this embodiment further includes a first acquisition module, configured to acquire a mapping relationship between logical channels and logical channel prioritization restrictions parameters configured by a resource allocation management node.

In the terminal of this embodiment, the first acquisition module includes: a first information report unit, configured to report logical channels of each sidelink and radio access technologies and/or resource types corresponding to the logical channels of each sidelink to a resource allocation management node; or, a second information report unit, configured to report logical channels of each sidelink and QoS parameters corresponding to the logical channels of each sidelink to the resource allocation management node; a mapping relationship acquisition unit, configured to acquire a mapping relationship between logical channels and logical channel prioritization restrictions parameters configured by the resource allocation management node.

The terminal of this embodiment further includes a second acquisition module, configured to acquire a mapping relationship between QoS parameters corresponding to sidelink logical channels and logical channel prioritization restrictions parameters configured by the resource allocation management node.

The terminal of this embodiment further includes a third determination module, configured to determine a mapping relationship between logical channels and logical channel prioritization restrictions parameters according to QoS parameters corresponding to the sidelink logical channels and the mapping relationship between QoS parameters corresponding to sidelink logical channels and logical channel prioritization restrictions parameters.

The terminal of this embodiment further includes: a fourth determination module, configured to determine a mapping relationship between logical channels and a first part of logical channel prioritization restrictions parameters; a third acquisition module, configured to acquire a mapping relationship between logical channels and a second part of logical channel prioritization restrictions parameters configured by a resource allocation management node.

Optionally, the first part of logical channel prioritization restrictions parameters includes at least one of the following parameters: a list of radio access technologies allowed to be used at a sidelink by a logical channel; a list of resource types allowed to be used at a sidelink by a logical channel; a list of subcarrier spacings allowed to be used at a sidelink by a logical channel; a maximum length of a transmission time interval allowed to be used at a sidelink by a logical channel; whether pre-configured resources are allowed to be used at a sidelink by a logical channel.

The second part of logical channel prioritization restrictions parameters are parameters, other than the first part of the logical channel prioritization restrictions parameters, of the logical channel prioritization restrictions parameters.

Optionally, the radio access technologies include, but are not limited to, at least one of the following: a sidelink radio access technology based on 4G LTE Rel-14; a sidelink radio access technology based on 4G LTE Rel-15; a sidelink radio access technology based on 5G NR.

Optionally, the resource types include unicast resources, multicast resources and broadcast resources; or broadcast resources and a set of unicast resources and multicast resources; or unicast resources and a set of multicast resources and broadcast resources.

In the terminal of this embodiment, the first determination module 401 includes: a first determination unit configured to; if a resource allocation mode selected by the terminal itself is used for the sidelink, determine that a target resource in a resource pool corresponding to the sidelink is a sidelink grant; and a reception unit configured to, if a scheduled resource allocation mode is used for the sidelink, receive a sidelink grant allocated by the resource allocation management node.

In the terminal of this embodiment, the resource allocation module 402 includes: a second determination unit configured to determine one or more first logical channels capable of using the sidelink grant, based on the sidelink grant and the mapping relationship between sidelink logical channels and logical channel prioritization restrictions parameters; a third determination unit configured to determine one or more target logical channels satisfying a preset condition among the one or more first logical channels; and a resource allocation unit configured to allocate resources for the one or more target logical channels.

In the terminal of the embodiment, the second determination unit is specifically configured to determine one or more second logical channels, in the sidelink, having a data transmission requirement; determine the one or more second logical channels as the one or more first logical channels if the sidelink grant meets a requirement of logical channel prioritization restrictions parameters corresponding to the one or more second logical channels.

In the terminal of the embodiment, the third determination unit is specifically configured to determine logical channels with the highest priority among the one or more first logical channels; determine a target identifier corresponding to the logical channels with the highest priority; determine one or more logical channels corresponding to the target identifier in the one or more first logical channels as the one or more target logical channels.

In the terminal of the embodiment, the resource allocation unit is specifically configured to allocate resources to logical channels in the one or more target logical channels sequentially in a descending order of priorities of the target logical channels from high to low.

In the terminal of the embodiment of the present disclosure, a sidelink grant is determined by the first determination module, and resources are allocated to the sidelink logical channels according to the sidelink grant and the mapping relationship between sidelink logical channels and logical channel prioritization restrictions parameters by the resource allocation module. In this way, after the terminal receives the sidelink grant, the terminal can arrange a data packet on the sidelink, and allocate a resource to a logical channel of the sidelink.

In some embodiments of the present disclosure, a computer readable storage medium is further provided. The computer readable storage medium has stored thereon a program that, when executed by a processor, implements following steps: determining a sidelink grant; allocating resources to sidelink logical channels according to the sidelink grant and according to a mapping relationship between sidelink logical channels and logical channel prioritization restrictions parameters.

When the program is executed by a processor, all implementations in the method embodiment applied to the terminal side as shown in FIG. 1 can be implemented, and in order to avoid repetition, detailed description thereof is omitted here.

Figure 5:
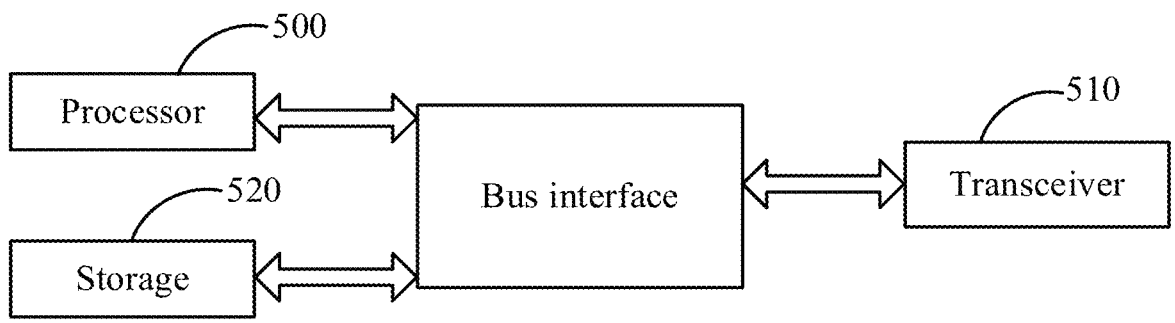
FIG. 5 is a structural block diagram of a node device according to an embodiment of the present disclosure.

As shown in FIG. 5, the embodiment of the present disclosure also provides a node device, and the node device is a network side device. The network side device includes a transceiver 510, a storage 520, a processor 500, and a program stored on the storage and executable by the processor. The processor 500 performs the following steps when executing the program: configuring a mapping relationship between sidelink logical channels and at least part of logical channel prioritization restrictions parameters for a terminal, or configuring a mapping relationship between QoS parameters corresponding to sidelink logical channels and logical channel prioritization restrictions parameters for a terminal; feeding the mapping relationship back to the terminal.

In FIG. 5, a bus architecture may include any number of interconnected buses and bridges. Specifically, various circuits such as one or more processors represented by the processor 500 and a storage represented by the storage 520 are linked together. The bus architecture may also link together various other circuits, such as peripheral devices, voltage regulators, and power management circuits, all of which are well known in the art and thus will not be described further herein. A bus interface provides an interface. A transceiver 510 may be a plurality of elements, i.e., including a transmitter and a transceiver, for providing means for communicating with various other devices over a transmission medium. The processor 500 is responsible for managing the bus architecture and general processings, and the storage 520 may store data used by the processor 500 when performing operations.

Optionally, the processor 500 may implement the following steps when executing the program: receiving logical channels of each sidelink and radio access technologies and/or resources type corresponding to the logical channels of each sidelink, reported by the terminal, or receiving logical channels of each sidelink and QoS parameters corresponding to the logical channels of each sidelink, reported by the terminal; and configuring the mapping relationship between the sidelink logical channels and at least part of logical channel prioritization restrictions parameters for the terminal.

Optionally, the logical channel prioritization restrictions parameters include at least one of the following parameters: a list of radio access technologies allowed to be used at a sidelink by a logical channel; a list of resource types allowed to be used at a sidelink by a logical channel; a list of subcarrier spacings allowed to be used at a sidelink by a logical channel; a maximum length of a transmission time interval allowed to be used at a sidelink by a logical channel; whether pre-configured resources are allowed to be used at a sidelink by a logical channel.

Optionally, the radio access technologies include at least one of the following: a sidelink radio access technology based on 4G LTE Rel-14; a sidelink radio access technology based on 4G LTE Rel-15; a sidelink radio access technology based on 5G NR.

Optionally, the resource types include unicast resources, multicast resources and broadcast resources; or broadcast resources and a set of unicast resources and multicast resources; or unicast resources and a set of multicast resources and broadcast resources.

Figure 6:
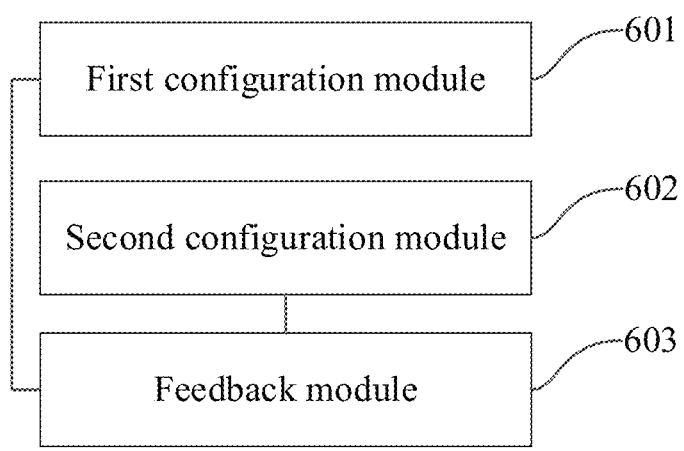
FIG. 6 is a modular schematic diagram of a node device according to an embodiment of the present disclosure.

As shown in FIG. 6, the embodiment of the present disclosure also provides a node device. The node device includes: a first configuration module 601 configured to configure a mapping relationship between sidelink logical channels and at least part of logical channel prioritization restrictions parameters for a terminal, or a second configuration module 602 configured to configure a mapping relationship between QoS parameters corresponding to sidelink logical channels and logical channel prioritization restrictions parameters for a terminal; and a feedback module 603 configured to feed the mapping relationship back to the terminal.

In the node device of the embodiment of the present disclosure, the first configuration module 601 includes: a first reception unit configured to receive logical channels of each sidelink and radio access technologies and/or resources type corresponding to the logical channels of each sidelink, reported by the terminal, or a second reception unit configured to receive the logical channels of each sidelink and QoS parameters corresponding to the logical channels of each sidelink reported by the terminal; and a configuration unit configured to configure the mapping relationship between the sidelink logical channels and at least part of logical channel prioritization restrictions parameters for the terminal.

Optionally, the logical channel prioritization restrictions parameters include at least one of the following parameters: a list of radio access technologies allowed to be used at a sidelink by a logical channel; a list of resource types allowed to be used at a sidelink by a logical channel; a list of subcarrier spacings allowed to be used at a sidelink by a logical channel; a maximum length of a transmission time interval allowed to be used at a sidelink by a logical channel; whether pre-configured resources are allowed to be used at a sidelink by a logical channel.

Optionally, the radio access technologies include at least one of the following: a sidelink radio access technology based on 4G LTE Rel-14; a sidelink radio access technology based on 4G LTE Rel-15; a sidelink radio access technology based on 5G NR.

Optionally, the resource types include unicast resources, multicast resources and broadcast resources; or broadcast resources and a set of unicast resources and multicast resources; or unicast resources and a set of multicast resources and broadcast resources.

In the node device according to the embodiment of the present disclosure, a mapping relationship between sidelink logical channels and at least part of logical channel prioritization restrictions parameters is configured for a terminal by the first configuration module, or a mapping relationship between QoS parameters corresponding to sidelink logical channels and logical channel prioritization restrictions parameters is configured for the terminal by the second configuration module, and the mapping relationship is fed back to the terminal by the feedback module. In this way, after the terminal receives the sidelink grant, the terminal can arrange a packet on the sidelink, and allocate resources for sidelink logical channels.

In some embodiments of the present disclosure, a computer readable storage medium is provided. The computer readable storage medium has stored thereon a program that, when executed by a processor, implements the steps of: configuring a mapping relationship between sidelink logical channels and at least part of logical channel prioritization restrictions parameters for a terminal, or configuring a mapping relationship between QoS parameters corresponding to sidelink logical channels and logical channel prioritization restrictions parameters for a terminal; feeding the mapping relationship back to the terminal When the program is executed by the processor, all the implementations of the method embodiment applied to the node device side as shown in FIG. 2 can be implemented. In order to avoid repetition, detailed description thereof is omitted here.

It will be appreciated that the embodiments described in the embodiments of the present disclosure may be implemented in hardware, software, firmware, middleware, microcode, or combinations thereof. For implementation in hardware, a processing unit may be implemented in one or more of an Application Specific Integrated Circuit (ASIC), a Digital Signal Processor (DSP), a Digital Signal Processing Device (DSPD), a Programmable Logic Device (PLD), a Field Programmable Gate Array (FPGA), a general purpose processor, a controller, a microcontroller, a microprocessor, other electronic units for performing the functions described in the present disclosure, or combinations thereof.

For implementation in software, techniques described in embodiments of the present disclosure may be implemented by modules (e.g., processes, functions, etc.) that perform the functions described in the embodiments of the present disclosure. Software codes may be stored in a storage and executed by a processor. The storage may be implemented in the processor or external to the processor, In various embodiments of the present disclosure, it should be understood that values of sequence numbers of the above-described processes do not imply an execution order, the execution order of the processes should be determined by their functions and inherent logic, and should not be construed as any limitation on implementation of the processes of the embodiments of the present disclosure.

The foregoing are optional embodiments of the present disclosure, and it should be noted that several modifications and embellishments may be made to those of ordinary skill in the art without departing from the principles set forth in the present disclosure, these improvements and embellishments should also be considered to be within the protection scope of the present disclosure.

What is claimed is:

1. A resource allocation method performed by a terminal, comprising:
   determining a sidelink grant;
   allocating resources to sidelink logical channels according to the sidelink grant and a mapping relationship between the sidelink logical channels and logical channel prioritization restrictions parameters,
   wherein the logical channel prioritization restrictions parameters comprise at least one of following parameters:
   a list of radio access technologies allowed to be used at a sidelink by a logical channel;
   a list of resource types allowed to be used at a sidelink by a logical channel;
   a list of subcarrier spacings allowed to be used at a sidelink by a logical channel;

a maximum length of a transmission time interval allowed to be used at a sidelink by a logical channel, wherein the method further comprises:

acquiring the mapping relationship, configured by a resource allocation management node, between logical channels and logical channel prioritization restrictions parameters by the terminal, wherein acquiring the mapping relationship, configured by the resource allocation management node, between logical channels and logical channel prioritization restrictions parameters comprises:

reporting logical channels of each sidelink and radio access technologies and/or resource types corresponding to the logical channels of each sidelink to the resource allocation management node, or reporting logical channels of each sidelink and quality-of-service parameters corresponding to the logical channels of each sidelink to the resource allocation management node;

acquiring the mapping relationship, configured by the resource allocation management node, between logical channels and logical channel prioritization restrictions parameters;

or, acquiring a mapping relationship, configured by the resource allocation management node, between quality-of-service parameters corresponding to sidelink logical channels and logical channel prioritization restrictions parameters, and after acquiring a mapping relationship, configured by the resource allocation management node, between quality-of-service parameters corresponding to sidelink logical channels and logical channel prioritization restrictions parameters, the method further comprises:

determining the mapping relationship between logical channels and logical channel prioritization restrictions parameters, according to the quality-of-service parameters corresponding to sidelink logical channels and according to the mapping relationship between the quality-of-service parameters corresponding to the sidelink logical channels and the logical channel prioritization restrictions parameters.

2. The resource allocation method according to claim 1, wherein the logical channel prioritization restrictions parameters further comprise a following parameter:

whether pre-configured resources are allowed to be used at a sidelink by a logical channel.

3. The resource allocation method according to claim 1, further comprising:

determining a mapping relationship between logical channels and a first part of logical channel prioritization restrictions parameters;

acquiring a mapping relationship, configured by a resource allocation management node, between logical channels and a second part of logical channel prioritization restrictions parameters.

4. The resource allocation method according to claim 1, wherein determining the sidelink grant, comprises:

if a resource allocation mode selected by the terminal itself is used for a sidelink, determining that a target resource in a resource pool corresponding to the sidelink is the sidelink grant;

if a scheduled resource allocation mode is used for a sidelink, receiving the sidelink grant, allocated by a resource allocation management node, corresponding to the sidelink; and/or allocating the resource to sidelink logical channels according to the sidelink grant and the mapping relationship between sidelink logical channels and logical channel prioritization restrictions parameters, comprise:

determining one or more first logical channels capable of using the sidelink grant, based on the sidelink grant and the mapping relationship between sidelink logical channels and logical channel prioritization restrictions parameters;

determining one or more target logical channels satisfying a preset condition among the one or more first logical channels;

allocating resources for the one or more target logical channels.

5. The resource allocation method according to claim 4, wherein determining the one or more first logical channels capable of using the sidelink grant, based on the sidelink grant and the mapping relationship between sidelink logical channels and logical channel prioritization restrictions parameters, comprises:

determining one or more second logical channels, in a sidelink, having a data transmission requirement;

determining the one or more second logical channels as the one or more first logical channels, if the sidelink grant meets a requirement of logical channel prioritization restrictions parameters corresponding to the one or more second logical channels.

6. The resource allocation method according to claim 4, wherein determining the one or more target logical channels satisfying the preset condition among the one or more first logical channels comprises:

determining one or more logical channels with a highest priority among the one or more first logical channels;

determining a target identifier corresponding to the one or more logical channels with the highest priority;

determining one or more logical channels corresponding to the target identifier in the one or more first logical channels as the one or more target logical channels.

7. A resource allocation method performed by a node device, comprising:

configuring a mapping relationship between sidelink logical channels and at least part of logical channel prioritization restrictions parameters for a terminal by the node device, or configuring a mapping relationship between quality-of-service parameters corresponding to sidelink logical channels and logical channel prioritization restrictions parameters for a terminal by the node device;

feeding the mapping relationship back to the terminal by the node device, wherein the logical channel prioritization restrictions parameters comprise at least one of following parameters:

a list of radio access technologies allowed to be used at a sidelink by a logical channel;

a list of resource types allowed to be used at a sidelink by a logical channel;

a list of subcarrier spacings allowed to be used at a sidelink by a logical channel;

a maximum length of a transmission time interval allowed to be used at a sidelink by a logical channel, wherein configuring the mapping relationship between sidelink logical channels and at least part of logical channel prioritization restrictions parameters for the terminal by the node device, comprises:

receiving, by the node device, logical channels of each sidelink and radio access technologies and/or resources type corresponding to the logical channels of each sidelink reported by the terminal, or receiving, by the node device, logical channels of each sidelink and quality-of-service parameters corresponding to the logical channels of each sidelink reported by the terminal;

configuring the mapping relationship between the sidelink logical channels and at least part of logical channel prioritization restrictions parameters for the terminal by the node device; or, wherein the mapping relationship between quality-of-service parameters corresponding to sidelink logical channels and logical channel prioritization restrictions parameters is used by the terminal to determine a mapping relationship between logical channels and logical channel prioritization restrictions parameters, according to the quality-of-service parameters corresponding to sidelink logical channels and according to the mapping relationship between the quality-of-service parameters corresponding to the sidelink logical channels and the logical channel prioritization restrictions parameters.

8. A node device, comprising:
a transceiver, a storage, a processor, and a program stored on the storage and executable by the processor, wherein the processor implements steps of the resource allocation method according to claim 7.

9. A terminal, comprising a transceiver, a storage, a processor and a program stored on the storage and executable by the processor, wherein when the processor executes the program, the processor implements the steps of:
determining a sidelink grant;
allocating resources to sidelink logical channels according to the sidelink grant and a mapping relationship between sidelink logical channels and logical channel prioritization restrictions parameters,
wherein the logical channel prioritization restrictions parameters comprise at least one of following parameters:
a list of radio access technologies allowed to be used at a sidelink by a logical channel;
a list of resource types allowed to be used at a sidelink by a logical channel;
a list of subcarrier spacings allowed to be used at a sidelink by a logical channel;
a maximum length of a transmission time interval allowed to be used at a sidelink by a logical channel,
wherein the processor further implements a following step when executing the program:
acquiring the mapping relationship, configured by a resource allocation management node, between logical channels and logical channel prioritization restrictions parameters, wherein acquiring the mapping relationship, configured by the resource allocation management node, between logical channels and logical channel prioritization restrictions parameters comprises:
reporting logical channels of each sidelink and radio access technologies and/or resource types corresponding to the logical channels of each sidelink to the resource allocation management node, or reporting logical channels of each sidelink and quality-of-service parameters corresponding to the logical channels of each sidelink to the resource allocation management node;

acquiring the mapping relationship, configured by the resource allocation management node, between logical channels and logical channel prioritization restrictions parameters; or, acquiring a mapping relationship, configured by the resource allocation management node, between quality-of-service parameters corresponding to sidelink logical channels and logical channel prioritization restrictions parameters, wherein the processor further implements a following step when executing the program, after acquiring a mapping relationship, configured by the resource allocation management node, between quality-of-service parameters corresponding to sidelink logical channels and logical channel prioritization restrictions parameters:

determining the mapping relationship between logical channels and logical channel prioritization restrictions parameters, according to the quality-of-service parameters corresponding to sidelink logical channels and according to the mapping relationship between the quality-of-service parameters corresponding to the sidelink logical channels and the logical channel prioritization restrictions parameters.

10. The terminal according to claim 9, wherein the processor further implements the following steps when executing the program:
determining a mapping relationship between logical channels and a first part of logical channel prioritization restrictions parameters;
acquiring a mapping relationship, configured by a resource allocation management node, between logical channels and a second part of logical channel prioritization restrictions parameters.

11. The terminal according to claim 9, wherein the processor further implements the following step when executing the program:
if a resource allocation mode selected by the terminal itself is used for a sidelink, determining that a target resource in a resource pool corresponding to the sidelink is the sidelink grant;
if a scheduled resource allocation mode is used for a sidelink, receiving the sidelink grant, allocated by a resource allocation management node, corresponding to the sidelink;
determining one or more first logical channels capable of using the sidelink grant, based on the sidelink grant and the mapping relationship between sidelink logical channels and logical channel prioritization restrictions parameters;
determining one or more target logical channels satisfying a preset condition among the one or more first logical channels;
allocating resources for the one or more target logical channels.

12. The terminal according to claim 11, wherein the processor further implements the following steps when executing the program:
determining one or more second logical channels, in a sidelink, having a data transmission requirement;
determining the one or more second logical channels as the one or more first logical channels, if the sidelink grant meets a requirement of logical channel prioritization restrictions parameters corresponding to the one or more second logical channels;
and/or determining one or more logical channels with a highest priority among the one or more first logical channels;

determining a target identifier corresponding to the one or more logical channels with the highest priority;
determining one or more logical channels corresponding to the target identifier in the one or more first logical channels as the one or more target logical channels.

\* \* \* \* \*